United States Patent [19]
Furuyoshi et al.

[11] Patent Number: 4,721,730
[45] Date of Patent: Jan. 26, 1988

[54] ADSORBENT FOR $\beta_2$-MICROGLOBULIN AND IMMUNOGLOBULIN L-CHAIN

[75] Inventors: Shigeo Furuyoshi; Eiji Ogino, both of Kobe; Nobutaka Tani, Osaka, all of Japan

[73] Assignee: Kanegafuchi Kagaku Kogyo Kabushiki Kaisha, Osaka, Japan

[21] Appl. No.: 55,387

[22] Filed: May 29, 1987

[30] Foreign Application Priority Data

May 30, 1986 [JP] Japan ................................. 61-126000
Sep. 19, 1986 [JP] Japan ................................. 61-222287
Sep. 19, 1986 [JP] Japan ................................. 61-222288
Sep. 19, 1986 [JP] Japan ................................. 61-222289

[51] Int. Cl.⁴ .............................................. C08J 9/36
[52] U.S. Cl. ..................................... 521/53; 436/532; 536/30; 536/56; 210/679; 210/692
[58] Field of Search ................. 521/53; 536/30, 56; 436/532; 210/679, 692

[56] References Cited

U.S. PATENT DOCUMENTS

| | | | |
|---|---|---|---|
| 4,411,795 | 10/1983 | Olsen | 210/679 |
| 4,654,420 | 3/1987 | Furuyoshi et al. | 521/53 |
| 4,656,261 | 4/1987 | Furuyoshi et al. | 521/53 |
| 4,668,706 | 5/1987 | Ford | 521/53 |
| 4,678,580 | 7/1987 | Bredy et al. | 521/53 |

OTHER PUBLICATIONS

Chem. Abstracts, 82:175675.
Chem. Abstracts, 99:1037735.

Primary Examiner—Morton Foelak
Attorney, Agent, or Firm—Armstrong, Nikaido, Marmelstein & Kubovcik

[57] ABSTRACT

An adsorbent for $\beta_2$-microglobulin and immunoglobulin L-chain suitable for use in an extracorporeal circulation treatment, which comprises a porous water-insoluble carrier and a compound immobilized onto said carrier, said compound satisfying that the value of log P, in which P is a partition coefficient in an octanol-water system, is not less than 2.5. The adsorbent is inexpensive, and efficiently adsorb and remove $\beta_2$-microglobulin and immunoglobulin L-chain contained in a body fluid.

3 Claims, 1 Drawing Figure

ADSORBENT FOR $\beta_2$-MICROGLOBULIN AND IMMUNOGLOBULIN L-CHAIN

BACKGROUND OF THE INVENTION

The present invention relates to an adsorbent suitable for use in an extracorporeal circulation treatment, to remove $\beta_2$-microglobulin (hereinafter referred to as "$\beta_2$-m") and immunoglobulin L-chain (hereinafter referred to as "L-chain") which are contained in a body fluid.

In recent years, many of patients who have been treated by dialysis for a long piriod suffer from carpal tunnel syndrome. "Carpal tunnel syndrome" is a disease attended with symptoms of paralysis of the median nerve due to compression of the median nerve at the part of carpal tunnel. Lately, it was found out that a $\beta$-fibril-like amyloid protein called "AH" was deposited on the diseased part. Further, it was found out that a precursor protein corresponding to the amyloid is the $\beta_2$-m which is contained in the patient's blood. However, there hitherto has not been found an effective treatment, especially drug treatment.

$\beta_2$-m is a low molecular protein (M. W. 11,800) consisting of one hundred of amino acids. The separation method by means of membrane has been used to separate a component in blood or plasma rather selectively according to the size so far. However, there are such disadvantages in this method as useful proteins except $\beta_2$-m may be removed and as the amount of removed $\beta_2$-m is small. Therefore a more selective and effective way to remove a lot of $\beta_2$-m is desired.

The method for removing $\beta_2$-m by means of adsorbent has hardly been used so far. A few examples of adsorbent for purification of $\beta_2$-m are known, for instance, an immunoadsorbent in which an anti $\beta_2$-m antibody is immobilized onto its carrier, an adsorbent based on a principle of affinity chromatography in which concanavalin A is immobilized as a compound showing an affinity for $\beta_2$-m (hereinafter referred to as "ligand") onto its carrier, and the like. Although these adsorbents show a high selectivity for $\beta_2$-m, they are not practical for a treatment because of the problems such as expensive anti $\beta_2$-m antibody and ligands, for instance, concanavalin A, an unstability in preservation and a difficulty of sterilization.

On the other hand, there is a desease called amyloidosis attended with serious troubles, for example, insufficiency of organs such as heart and kidrey, disturbance of impulse conducting system, progressive dementia, cerebrovascular disease, nerve trouble and so on. Amyloidosis is caused by a deposition of amyloid on a blood vessel, a certain organ and so on. It is known that there are some types of amyloidosis, i.e., primary amyloidosis, secondary amyloidosis, familial amyloidosis, senile amyloidosis, and so on, and that the composition of proteins causing amyloidosis differs depending on the type of amyloidosis.

Primary amyloidosis is caused by a protein called "AH", and the precursor corresponding to deposited amyloid is supposed to be L-chain. However, there hitherto has not been found an effective treatment, especially drug treatment. L-chain is a low molecular protein (M. W. 23,000) consisting of two hundreds of amino acids in the form of monomer.

Besides the primaly amyloidosis, there are some diseases attended with an extraordinary product of L-chain. The typical diseases are multiple myeloma, macroglobulinemia or malignant lymphoma and the highly produced L-chain in these diseases is a cloned protein called Bence Jones protein (hereinafter referred to as "BJP"). Usually BJP is excreted into urine. At that time, it inhibits the reabsorption of other proteins, especially albumin, and causes a myeloma kidney syndrone. Also, there are many cases to cause amyloidosis at heart, kidney and so on as a result of a deposition of a lot of BJP in serum. Therefore, an effective method for removing BJP in serum is wanted. However, there has not been found a practical method for removing so far, as same as that for primary amyloidosis.

The object of the present invention is to solve the mentioned problems and to provide an inexpensive adsorbent for use in an extracorporeal circulation treatment which is able to adsorb and remove a lot of both $\beta_2$-m and L-chain.

SUMMARY OF THE INVENTION

In accordance with the present invention, there is provided an adsorbent for $\beta_2$-m and L-chain suitable for use in an extracorporeal circulation treatment, which comprises a porous water-insoluble carrier and a compound immobilized onto said carrier, said compound satisfying that the value of log P, in which P is a partition coefficient in an octanol water system, is not less than 2.5.

DETAILED DESCRIPTION OF THE INVENTION

Figure 1:
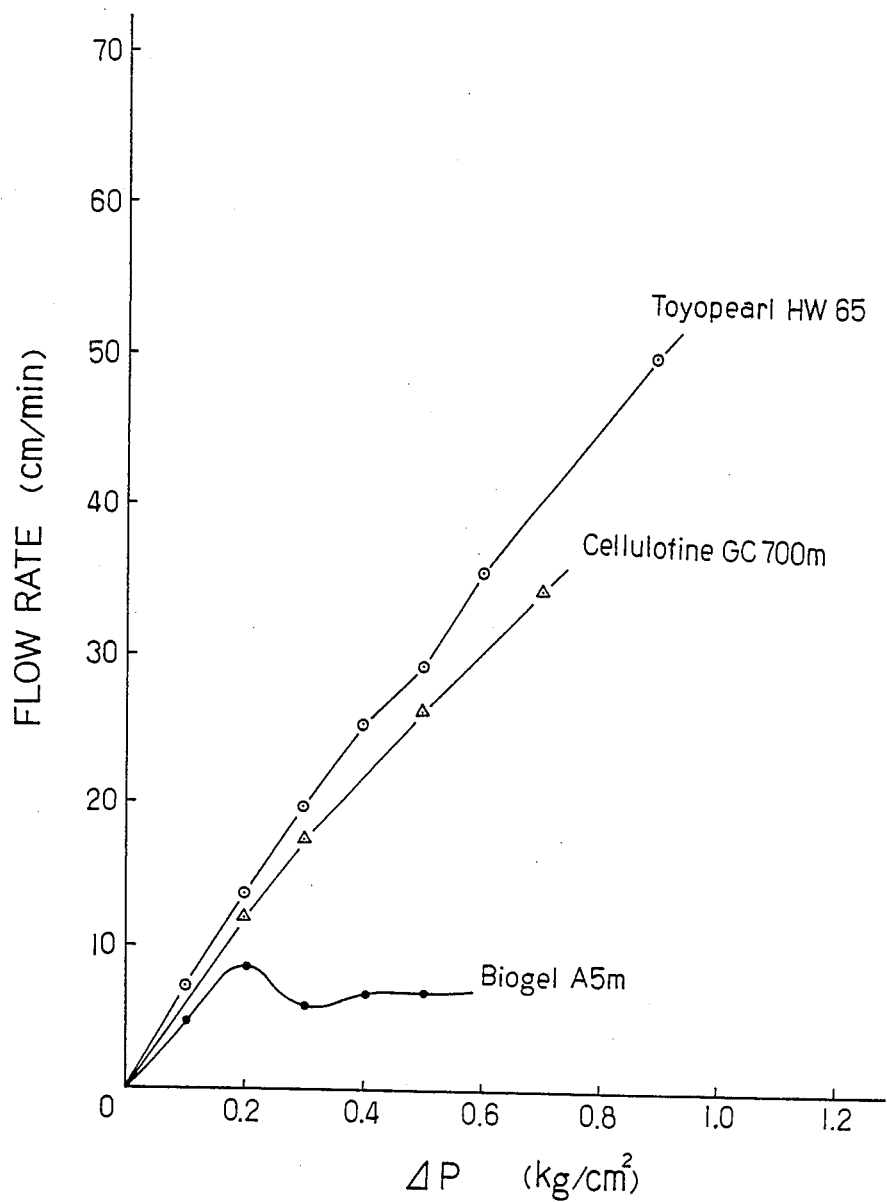
FIG. 1 is a graph showing a relation between a flow rate and a pressure drop $\Delta P$ obtained in Reference Example.

The adsorbent of the present invention comprises a porous water-insoluble carrier and a compound immobilized onto said carrier, said compound satisfying that the value of log P is not less than 2.5.

The logarithm of a partition coefficient in an octanol-water system, i.e. log P, is a hydrophobic parameter of a compound. The partition coefficient P is obtained according to the following typical method.

First of all, a compound is dissolved in an octanol (or a water) and an equal volume of a water (or an octanal) is added thereto. After shaking for 30 minutes by Griffin flask shaker (made by Griffin & George Ltd.), it is centrifuged for from 1 to 2 hours at 2000 rpm. Then concentrations of the compound in both octanol and water layer can be measured by various methods such as spectroscopic method and GLC, and the value of P is obtained according to the following formula:

P = Coct/Cw

Coct: a concentration of a compound in an octanol layer

Cw: a concentration of a compound in a water layer

Before now, many investigators have measured log P of various compounds and the found values were put in order by C. Hansch et. al. ["PARTITION COEFFICIENTS AND THEIR USES", Chemical Reviews, 71, 525 (1971)]. As to the compounds whose found values are unknown, the calculated values using a hydrophobic fragmental constant f (hereinafter referred to as "$\Sigma f$"), shown in "THE HYDROPHOBIC FRAGMENTAL CONSTANT" (Elsevier Sci. Pub. Com., Amsterdam, 1977) written by R. F. Rekker, can be a good guide.

A hydrophobic fragmental constant show the hydrophobicity of various fragments, which are determined by a statistical management of many found values of log P, and the total of f of each fragment, i.e. Σf which is a constitutent of one compound almost corresponds to log P.

In order to find out a compound which has an effect on adsorbing $\beta_2$-m and L-chain, compounds having various log P are immobilized onto a carrier. As a result, it is found that compounds, whose value of log P are not less than 2.50, are effective on adsorbing $\beta_2$-m and L-chain and that compounds, whose value of log P are less than 2.50, hardly show an adsorption ability of $\beta_2$-m and L-chain.

In a case of alkyl amine being immobilized, for example, an adsorption ability of $\beta_2$-m and L-chain is extraordinarily increased by using n-octyl amine (log P=2.90) instead of using n-hexyl amine (log P=2.06).

These results indicate that an adsorption of $\beta_2$-m and L-chain on an adsorbent of the present invention is caused by the hydrophobic interaction between atomic groups, which are introduced into a carrier through immobilizing compounds whose value of log P are not less then 2.50, and $\beta_2$-m and L-chain, and that compounds whose value of log P are less than 2.50 have no adsorption ability on an account of its too small hydrophobicity.

In the present invention, compounds immobilized onto a porous water-insoluble carrier, satisfying that the value of log P are not less than 2.50 can be used without no particular limitation. However, in a case of immobilizing a compound onto a carrier by chemical bond, a part of the compound is frequently eliminated. When the elimination group greatly contributes to the hydrophobicity of the compound, i.e. when the f of the atomic group immobilized onto a carrier by elimination is smaller than 2.50, the compound is not suited for using at the present invention in view of the object of the present invention. The typical example is that benzoic acid isopentylester (Σf=4.15) is immobilized onto a carrier, having a hydroxy group, by an ester interchange. In this case, the atomic group immobilized onto a carrier is $C_6H_5CO-$ and Σf of this group is under 1. Therefore, whether a compound is sufficient as a compound used in the present invention or not may be determined depending on whether the value of log P, when an elimination part of the group is substituted by hydrogen, is less than 2.50 or not.

Among the compounds whose value of log P is not less than 2.50, compounds having functional groups which are available for immobilization onto a carrier, e.g. unsaturated hydrocarbons, alcohols, amines, thiols, carbonic acids and its derivatives, halides, aldehydes, hydrazides, isocyanates, compounds having an oxirane ring such as glycidyl ethers, halogenated silanes and so on are preferable. The typical examples of these compounds are amines such as n-heptylamine, n-octylamine, decylamine, dodecylamine, hexadecylamine, octadecylamine, 2-aminooctene, naphtylamine, phenyl-n-propylamine and diphenylmethylamine, alcohols such as n-heptylalcohol, n-octylalcohol, dodecylalcohol, hexadecylalcohol, 1-octene-3-ol, naphtol, diphenylmethanol and 4-phenyl-2-butanol, glycidylethers thereof, carbonic acids such as n-octanoic acid, nonanoic acid, 2-nonenoic acid, decanoic acid, dodecanoic acid, stearic acid, arachidonic acid, oleic acid, diphenylacetic acid and phenylpropionic acid, carbonic acid derivatives thereof such as acid halides, ester and amide, halides such as octylchloride, octylbromide, decylchloride and dodecylchloride, thiols such as octanethiol an dodecanethiol, halogenated silanes such as n-octyltrichlorosilane and octadecyltrichlorosilane, and aldehydes such as n-octylaldehyde, n-caprinaldehyde and dodecylaldehyde.

Moreover, among the above-mentioned compounds whose hydrogen in their hydrocarbon moiety is substituted by substituents having hetero atoms such as hoalogen, nitrogen, oxygen and sulfur, other alkyl groups and so on, the compounds whose log P are not less than 2.50 can be used. And the compounds shown on the tables of from page 555 to page 613 in the above mentioned reference, "PARTITION COEFFICIENTS AND THEIR USES", satisfying that the value of log P are not less than 2.50 can also be used. However, the present invention is not limited thereto.

These compound may be used alone, in combination thereof or even together with a compound having a value of log P of less than 2.5.

The typical examples of the water-insoluble carriers in the present invention are inorganic carriers such as glassbeads and silicagel, organic carriers made of synthetic polymers such as cross linked polyvinylalcohol, cross linked polyacrylate, cross linked polyacrylamide, cross linked polystyrene and polysaccharides such as crystal cellulose, cross linked cellulose, cross linked agarose and cross linked dextran, and complex carrier obtained by combining them, e.g. organic-organic carrier, organic-inorganic carrier and so on. Especially, hydrophilic carriers are preferable since non-specific adsorption is rather small and the adsorption selectivity for $\beta_2$-m and L-chain is good.

The term "hydrophilic carriers" means the carriers which contact with water at an angle of not more than 60° when compounds constituting the carriers are made plane. Typical examples of these carriers are of cellulose, polyvinylalcohol, saponificated compound of ethylene-vinyl acetate vinyl copolymer, polyacrylamide, polyacrylic acid, polymethacrylic acid, polymethyl methacrylate, acrylic acid grafted polyethylene, acrylamide grafted polyethylene, glass and so on. In particular, the porous cellulose gels are preferred for the reasons that (1) they are hard to be broken into pieces or fine powder by operation such as agitation because of a relatively high mechanical strength and toughness, and also even if a body fluid is passed through a column packed therewith at a high flow rate, consolidation and choking do not occur and, therefore, it is possible to pass a body fluid at a high flow rate, and further the pore structure is hard to suffer change upon high pressure steam sterilization, (2) the gels are hydrophilic because of being made of cellulose and plenty of hydroxyl group utilizable for bonding the sulfated polysaccharide, and also nonspecific adsorption is a little, (3) an adsorption capacity comparable to that of the soft gels is obtained, because the strength is maintained relatively high even if the porosity volume is increase, and (4) the safety is high as compared with the synthetic polymer gels. However, the present invention is not limited thereto. The above-mentioned carriers may be used either alone or in combination thereof volantarily.

The most essential property for a water-insoluble carrier of the present invention is to contain a lot of pores having apreferable size, i.e. to have a porous sructure. $\beta_2$-m and L-chain, both of which are objects to be removed by the adsorbent of the present invention, are proteins having molecular weights 11,800 and 23,000 respectively as mentioned above. And it is preferable for an effective adsorption of these proteins that $\beta_2$-m and L-chain can enter the pores of adsorbent at a certain high probability, but on the other hand, that other proteins can hardly enter the pores. There are many methods for measuring pore size. Though mercury porosimetry is most widely used now, sometimes it cannot be applied to the proous water-insoluble carrier of the present invention. In such case, it is proper to use the molecular weight of the exclusion limit as a measure of the pore size.

The term "the molecular weight of the exclusion limit" means, for instance, as described ithe literature such as "Jikken Kosoku Ekitai Chromatography (Experimental High Performance Liquid Chromatography)" written by Hiroyuki Hatano and Toshihiko Hanai, published by Kabushiki Kaisha Kagaku Dojin, the minimum molucular weight of the molucule which cannot permeate into a pore i.e. which is excluded, in a gel permeation chromatography.

The molecular weight of the exclusion limit is generally well studied about globular protein, dextran, polyethylene-glycol and so on and, in case of the carrier of the present invention, it is proper to use the value obtained by globular protein.

As the result of an investigation using carriers having various molucular weights of the exclusion limit, it is shown that the preferable range of pore size indicated by molecular weight of the exclusion limit is from $1 \times 10^4$ to $6 \times 10^5$. That is, it is found that a carrier having a molucular weight of the exclusion limit of less than $1 \times 10^4$ can hardly adsorb the $\beta_2$-m and L-chain and is not suited for practical use and that a carrier having a molecular weight of exclusion limit of over $6 \times 10^5$ adsorbs a large amount of proteins other than $\beta_2$-m and L-chain, mainly albumin, and is not suited for practicle use in the point of selectivity. Therefore, the molecular weight of the exclusion limit of the carrier empoyed in the present invention is preferably from $1 \times 10^4$ to $6 \times 10^5$, more preferably from $2 \times 10^4$ to $3 \times 10^5$.

With respect to the porous structure of a carreir, a structure uniformly having pores at any part of the carrier is more preferable than a structure having pores only on the surface from the viewpoint of adsorption capacity per unit volume. And it is preferred that the porosity of a carrier is not less than 20% and the specific surface area is not less than 3 m²/g.

The shape of a carrier can be optionally selected from such shapes as particle, fiber and hollow fiber.

In the present invention, it is preferable that there are some functional groups which are available for immobilizing a ligand onto the surface of the carriers. Typical examples of the above functional groups are hydroxyl group, amino group, aldehyde group, carboxyl group, thiol group, silanol group, amide group, epoxy group, halogen group, succinimide group, acid anhydride group and the like.

Both a soft carrier and a hard carrier may be employed in the present invention. However, when the carrier is used as an adsorbent for an extracorporeal circulation treatment, it is important that the carrier has a sufficient mechanical strength so as to prevent consolidation when a body fluid is passed through a column packed with the adsorbent.

Therefore, it is preferable that a carrier employed in the present invention is a hard carrier. The term "hard carrier" means, as shown in the Reference Example herein below, that the relation between a pressure drop $\Delta P$ and a flow rate determined by passing an aqueous fluid through a cylindrical column uniformly packed with the gel, such as particle gel, keeps a linear relationship until the pressure drop is increased to 0.3 kg/cm².

The adsorbent of the present invention is obtained by immobilizing a compound, whose value of log P is not less than 2.50, on a porous water-insoluble carrier and there are many known methods available for immobilization without any particular limitation. However, it is important in view of the safety to minimize the elimination and elution of ligands during a sterilization or a treatment because the adsorbent of the present invention is employed for an extracorporeal circulation treatment. Therefore, it is most preferable that a compound is immobilized onto a carrier by a covalent bond.

There are many ways of using the adsorbent of the present invention in a treatment. For the most simple example, the adsorbent of the present invention can be used as follows: i.e. partients's blood is introduced outside of his body so as to be put into a blood bag and then mixed with the adsorbent of the present invention to remove $\beta_2$-m and L-chain, followed by removing the adsorbent through filter. Consequently, the blood treated in this way is returned back to the patient himself. Though this method does not need an intricate apparatus, there are some defects such as a small amount of a treated blood at one time, a lot of time for treatment and a complicated operation.

For another method, a column packed with the adsorbent of the present invention is incorporated into an extracorporeal circulation circuit, and then removal of $\beta_2$-m and L-chain by adsorption is taken by on-line system. There are two treatment methods: i.e. one is that whole blood is directly perfused and another is that only plasma separated from the blood is passed through the column.

The adsorbent of the present invention can be used in any of above methods and, as mentioned above, online system is most preferable.

Present invention is more specifically described and explained by the following Reference Example, Examples and Comparative Examples. It is to be understood that the present invention is not limited to the Reference Example, Examples and Comparative Examples and various changes anad modifications can be made without departing from the scope and spirit of the present invention.

REFERENCE EXAMPLE

A relation between a flow rate and a pressure drop $\Delta P$ was determined by passing water by means of a peristaitic pump through cylindrical glass columns (inner diameter: 9 mm, column length: 150 mm) equipped at both ends with filters having a pore size of 15 $\mu$m, in which an agarose gel (Biogel A5m made by Biorado Co., particle size: 50 to 100 mesh) a vinyl polymer gel (Toyopearl HW-65 made by Toyo Soda Manufacturing Co., Ltd., particle size: 50 to 100 $\mu$m, and a cellulose gel (Cellulofine GC-700m made by Chisso Corporation, particle size: 45 to 105 $\mu$m) were packed respectively. The results are shown in FIG. 1.

As shown in FIG. 1, an increase of a flow rate is nearly proportional to that of a pressure drop in case of toyopearl HW-65 and Cellulofine GC-700m, whereas in case of Biogel A-5m, consolidation occurrs and a flow rate does not increase even if a pressure drop increases. In the present invention, the term "hard gel" means a gel having the relation between a pressure drop $\Delta P$ and a flow rate keeps a liner relationship until the pressure drop is increased to 0.3 kg/cm², as in the former case of toyopearl HW-5 and Cellulofine GC-700m.

EXAMPLE 1

After water was added to 170 ml of a porous cellulose hard gel Cellulofine GC-200m (made by Chisso Corporation, exclusion limit of globular proteins: 120,000) to make the whole volume 340 ml, 90 ml of 2M aqueous solution of sodium hydroxide is added thereto and the-temperature of reaction mixture was adjusted to 40° C. Then there was added 31 ml of epichlorohydrin and the reaction mixture was reacted with stirring for 2 hours at 40° C. After the reaction, the resultant was thoroughly washed with water to give an epoxy-activated gel.

To 10 ml of the obtained epoxy-activated gel was added 200 mg of n-octylamine (log P=2.90). After 6 days reaction by allowing it to stand in a 50% by volume aqueous solution of ethanol at 45° C., the resultant was throughly washed with a 50% by volume aqueous solution of ethanol, ethanol, agains a 50% by volume aqueous soluction and then water to give an n-octylamine-immobilized gel.

To 0.5 ml of the obtained n-octylamine-immobilized gel was added 2 ml of serum of a patient who is under dialysis treatment, the serum containing $\beta_2$-m in a concentration of 65 μg/ml and the mixture was incubated for 2 hours a 37° C. The concentrations of $\beta_2$-m and albumin in the supernatant were measured to obtain the amount of adsorbed $\beta_2$-m, ratio of adsorbed $\beta_2$-m based on $\beta_2$-m added first and amount of adsorbed albumin.

The results are shown in Table 1.

EXAMPLE 2

The procedures in Example 1 were repeated except that 315 mg of dodecylamine ($\Sigma f=5.10$) was used instead of n-octylamine to give a dodecylamine-immobilized gel.

The adsorption of the obtained dodecylamine-immobilized gel was examined by means of the same procedures as in Example 1.

The result is shown in Table 1.

EXAMPLE 3

The procedures in Example 1 were repeated except that 170 ml of a porous cellulose hard gel Cellulofine GC-700m (made by Chisso Corporation, exclusion limit of globular proteins: 400,000) was used as a carrier instead of Cellulofine GC-200m to give an n-octylamine-immobilized gel.

The adsorption of the obtained n-octylamine-immobilized gel was examined by means of the same procedures as in Example 1.

The result is shown in Table 1.

EXAMPLE 4

The procedures in Example 3 were repeated except 315 mg of that dodecylamine was used instead of n-octylamine to give a dodecylamine-immobilized gel.

The adsorption of the obtained dodecylamine-immobilized gel was examined by means of the same procedures as in Example 1.

The results is shown in Table 1.

EXAMPLE 5

The procedures in Example 3 were repeated except that 410 mg of cetylamine ($\Sigma f=7.22$) was used instead of n-octylamine and that ethanol was used as a solvent in immobiliation instead of a 50% by volume aqueous solution of ethanol to give a cetylamine-immobilized gel.

The adsorption of the obtained cetylamine-immobilized gel was examined by means of the same procedures in Example 1.

The result is shown in Table 1.

EXAMPLE 6

The procedures in Example 2 were repeated except that 170 ml of a porous cellulose hard gel Cellulofine GCL-300m (made by Chisso Corporation, exclusion limit of globular proteins: 90,000) was used as a carrier instead of Cellulofine GC-200m to give a dodecylamine-immobilized gel.

The adsorption of the botained dodecylamine-immobilized gel was examined by means of the same procedures as in Example 1.

The result is shown in Table 1.

EXAMPLE 7

The procedures in Example 1 were repeated except that 170 ml of a porous cellulose hard gel Cellulofine GC-100m (made by Chisso Corporation, exclusion limit of globular proteins: 60,000) was used as a carrier instead of Cellulofine GC-200m to give an n-octylamine-immobilized gel.

The adsorption of the obtained n-octylamine-immobilized gel was examined by means of the same procedures as in Example 1.

The result is shown in Table 1.

EXAMPLE 8

The procedures in Example 1 were repeated except that 170 ml of a porous cellulose hard gel Cellulofine GCL-90m (made by Chisso Corporation, exclusion limit of globular proteins: 35,000) was used as a carrier instead of Celulofine GC-200m to give an n-octylamine-immobilized gel.

The adsorption of the obtained n-octylamine-immobilized gel was examined by means of the same procedures as in Example 1.

The result is shown in Table 1.

EXAMPLE 9

The porcedures in Example 1 were repeated except that 170 ml of a porous vinyl polymer hard gel Toyopearl HW-50 coarse (made by Toyo soda Manufacturing Co., ltd., exclusion limit of globular proteins: 80,000) was used as a carrier instead of Cellulofine GC-200m to give an n-octylamine-immoblized gel.

the adsorption of the obtained n-octylamine-immobilized gel was examined by means of the same procedures as in Example 1.

The result is shown in Table 1.

EXAMPLE 10

The procedures in Example 1 were repeated except that 170 ml of a porous cellulose hard gel Cellulofine GCL-300m was used as a carrier instead of Cellulofine GC-200m and that 200 mg of dodecylamine was used instead of n-octylamine to give a dodecylamine-immobilized gel.

To 0.5 ml of the obtained dodecylamine-immobilized gel was added 3 ml of plasma of a IgA myeloma patient, the plasma containing Bence Jones protein which is the immunoglobulin L-chain in a concentration of 200 μg/ml, and the mixture was incubated for 2 hours at 37°

C. The concentrations of BJP and albumin in the supernatant were measured to obtain the amount of adsorbed BJP, ratio of adsorbed BJP based on BJP added first and amount of adsorbed albumin.

The results are shown in Table 2.

EXAMPLE 11

The procedures in Example 10 were repeated except that 410 mg of cetylamine was used instead of dodecylamine to give a ceytlamine-immobilized gel.

The adsorption of the obtained cetylamine-immobilized gel was examined by means of the same procedures as in Example 10.

The result is shown in Table 2.

EXAMPLE 12

The procedures in Example 10 were repeated except that 170 ml of a porous cellulose hard gel Cellulofine GC-700m was used as a carrier instead of Cellulofine GCL-300m and that 220 mg of n-octylamine was used instead of dodecylamine to give an n-octylamine-immobilized gel.

The adsorption of the obtained n-octylamine-immobilized gel was examined by means of the same procedures as in Example 10.

The result is shown in Table 2.

EXAMPLE 13

The pocedures in Example 12 were repeated except that 315 mg of dodecylamine was used instead of n-octylamine to give a dodecylamine-immobilized gel.

The adsorption of the obtained dodecylamine-immobilized gel was examined by means of the same procedures as in Example 10.

The result is shown in Table 2.

EXAMPLE 14

The procedures in Example 12 were repeated except that 410 mg of cetylamine was used instead of n-octylamine to give a cetylamine-immobilized gel.

The adsorption of the obtained cetylamine-immobilized gel was examined by means of the same procedures as in Example 10.

The result is shown in Table 2.

EXAMPLE 15

The procedures in Example 10 were repeated except that 170 ml of a porous cellulose hard gel Cellulofine GC-200m was used as a carrier instead of Cellulofine GCL-300m to give a dodecylamine-immobilized gel.

The adsorption of the obtained dodecylamine-immobilized gel was examined by means of the same procedures as in Example 10.

The result is shown in Table 2.

EXAMPLE 16

The procedures in Example 15 were repeated except that 410 mg of cetylamine was used instead of dodecylamine to give a cetylamine-immobilized gel.

The adsorption of the obtained cetylamine-immobilized gel was examined by means of the same procedures as in Example 10.

The result is shown in Table 2.

COMPARATIVE EXAMPLE 1

The procedures in Example 3 were repeated except that 172 mg of n-hexylamine (log P=2.06) was used instead of n-octylamine to give an n-hexylamine-immobilized gel.

The adsorption of the obtained n-hexylamine-immobilized gel was examined by means of the same procedures as in Example 1.

The result is shown in Table 1.

COMPARATIVE EXAMPLE 2

The procedures in Example 3 were repeated except that 125 mg of n-butylamine (log P=0.97) was used instead of n-octylamine and that water was used as a solvent in immobilization instead of a 50% by volume aqueous solution of ethanol to give an n-butylamine-immobilized gel.

The adsorption of the obtained n-butylamine-immobilized gel was examined by means of the same procedures as in Example 1.

The result is shown in Table 1.

COMPARATIVE EXAMPLE 3

The procedures in Example 10 were repeated except that 170 ml of a porous cellulose hard gel Cellulofine GC-700m was used as a carrier instead of Cellulofine GCL-300m and that 500 µl of 70% by weight aqueous solution of ethylamine (log P= −0.13) was used instead of dodecylamine to give an ethylamine-immobilized gel.

The adsorbent of the obtained ethylamine-immobilized gel was examined by meanas of the same procedures as in Example 10.

The result is shown in Table 2.

COMPARATIVE EXAMPLE 4

The procedures in Comparative Example 3 were repeated except that 125 mg of n-butylamine was used instead of ethylamine to give an n-butylamine-immobilized gel.

The adsorbent of the obtained n-butylamine-immobilized gel was examined by means of the same procedures asa in Example 10.

The result is shown in Table 2.

TABLE 1

| Ex. No. | ligand | log P ($\Sigma f$) | carrier | amount of adsorbed $\beta_2$-m (µg/ml gel) | adsorbed ratio of $\beta_2$-m (%) | amount of adsorbed albumin (mg/ml gel) |
| --- | --- | --- | --- | --- | --- | --- |
| 1 | n-octylamine | 2.90 | Cellulofine GC-200 m | 249 | 96 | 0 |
| 2 | dodecylamine | (5.10) | " | 258 | 99 | 0 |
| 3 | n-octylamine | 2.90 | Cellulofine GC-700 m | 209 | 81 | 8 |
| 4 | dodecylamine | (5.10) | " | 258 | 99 | 4 |
| 5 | cetylamine | (7.22) | " | 258 | 99 | 4 |
| 6 | dodecylamine | (5.10) | Cellulofine GCL-300 m | 258 | 99 | 0.1 |
| 7 | n-octylamine | 2.90 | Cellulofine GC-100 m | 113 | 43 | 0 |
| 8 | " | 2.90 | Cellulofine GC-90 m | 175 | 67 | 0 |
| 9 | " | 2.90 | Toyopearl HW-50 coarse | 184 | 71 | 0.2 |
| Com. | n-hexylamine | 2.06 | Cellulofine GC-700 m | 31 | 12 | 12 |

TABLE 1-continued

| Ex. No. | ligand | log P ($\Sigma f$) | carrier | amount of adsorbed $\beta_2$-m ($\mu$g/ml gel) | adsorbed ratio of $\beta_2$-m (%) | amount of adsorbed albumin (mg/ml gel) |
|---|---|---|---|---|---|---|
| Ex. 1 Com. Ex. 2 | n-butylamine | 0.97 | " | 7.8 | 3 | 1 |

TABLE 2

| Ex. No. | ligand | log P ($\Sigma f$) | carrier | amount of adsorbed BJP ($\mu$g/ml gel) | adsorbed ratio of BJP (%) | amount of adsorbed albumin (mg/ml gel) |
|---|---|---|---|---|---|---|
| 10 | dodecylamine | (5.10) | Cellulofine GLC-300 m | 852 | 71 | 2.4 |
| 11 | cetylamine | (7.22) | " | 888 | 74 | 0 |
| 12 | n-octylamine | 2.90 | Cellulofine GC-700 m | 1044 | 87 | 10.2 |
| 13 | dodecylamine | (5.10) | " | 1080 | 90 | 1.2 |
| 14 | cetylamine | (7.22) | " | 1044 | 87 | 0 |
| 15 | dodecylamine | (5.10) | Cellulofine GC-200 m | 804 | 67 | 0.6 |
| 16 | cetylamine | (7.22) | " | 672 | 56 | 0 |
| Com. Ex. 3 | ethylamine | −0.13 | Cellulofine GC-700 m | <60 | <5 | 0 |
| Com. Ex. 4 | n-butylamine | 0.97 | " | 204 | 17 | 0 |

As shown in Tables 1 and 2, the adsorbent of the present invention effectively adsorbs both $\beta_2$-m and L-chain, while albumin is hardly adsorbed.

In addition to the ingredients used in the Examples, other ingredients can be used in the Examples as set forth in the specification to obtain substantially the same results.

What we claim is:

1. An adsorbent for $\beta_2$-microglobulin and immunoglobulin L-chain suitable for use in an extracorporeal circulation treatment, which comprises a porous water-insoluble carrier, and carrier having molucular weight of the exclusion limit measured with a globular protein from $1 \times 10^4$ to $6 \times 10^5$, and a compound immobilized onto said carrier, said compound satisfying that the value of log P, in which P is a partition coefficient in an octanol-water system, is not less than 2.5.

2. The adsorbent of claim 1, wherein said porous water-insoluble carrier is a hydrophilic carrier.

3. The adsorbent of claim 1, wherein said porous water-insoluble carrier is a hard carrier.

* * * * *